United States Patent
Mochizuki et al.

(10) Patent No.: US 11,222,436 B2
(45) Date of Patent: Jan. 11, 2022

(54) PRESENTING AN IMAGE INDICATING A POSITION FOR A PERSON IN A LOCATION THE PERSON IS WAITING TO ENTER

(71) Applicant: INTERNATIONAL BUSINESS MACHINES CORPORATION, Armonk, NY (US)

(72) Inventors: Tomoka Mochizuki, Tokyo (JP); Wen Lianzi, Kawasaki (JP); Munehiko Sato, Tokyo (JP); Tomonori Sugiura, Yokohama (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 283 days.

(21) Appl. No.: 16/692,651

(22) Filed: Nov. 22, 2019

(65) Prior Publication Data
US 2020/0090363 A1 Mar. 19, 2020

Related U.S. Application Data

(63) Continuation of application No. 15/807,003, filed on Nov. 8, 2017, now Pat. No. 10,607,365.

(51) Int. Cl.
*G06F 3/147* (2006.01)
*G06T 11/60* (2006.01)
(Continued)

(52) U.S. Cl.
CPC ........... *G06T 7/70* (2017.01); *G06F 3/147* (2013.01); *G06K 9/00778* (2013.01); *G06T 11/60* (2013.01)

(58) Field of Classification Search
None
See application file for complete search history.

(56) References Cited

U.S. PATENT DOCUMENTS

| 10,379,537 B1 | 8/2019 | Arden et al. |
| 2007/0272497 A1 | 11/2007 | Kawai |

(Continued)

FOREIGN PATENT DOCUMENTS

| CN | 103771207 | 5/2014 |
| CN | 103803365 | 5/2014 |

(Continued)

OTHER PUBLICATIONS

Yang et al., "Clustering method for counting passengers getting in a bus with single camera", http://opticalengineering.spiedigitallibrary.org/article.aspx?articleid=1096305, SPIE Digital Library, Optical Engineering, vol. 49, Issue 3, Machine Vision, Pattern Recognition, Mar. 1, 2010, 10 pages.

(Continued)

*Primary Examiner* — Idowu O Osifade
(74) *Attorney, Agent, or Firm* — Scott Dobson; Andrew D. Wright; Roberts Calderon Safran & Cole, P.C.

(57) ABSTRACT

Methods for presenting an image indicating a position for a person are disclosed. A method includes: determining, by a computing device, at least one free space in a location using at least one camera; determining, using the computing device, a new position for a first person in the location based upon the determined at least one free space in the location; and presenting an image to indicate the determined new position for the first person in the location.

20 Claims, 21 Drawing Sheets

(51) Int. Cl.
*G06K 9/00* (2006.01)
*G06T 7/70* (2017.01)

(56) References Cited

U.S. PATENT DOCUMENTS

| | | |
|---|---|---|
| 2012/0020518 A1 | 1/2012 | Taguchi |
| 2014/0072170 A1 | 3/2014 | Zhang et al. |
| 2014/0348382 A1* | 11/2014 | Sasatani .................. G06T 7/73 |
| | | 382/103 |
| 2015/0325270 A1 | 11/2015 | Utsunomiya et al. |
| 2016/0048894 A1* | 2/2016 | Kaiser ................ G06Q 30/0613 |
| | | 705/26.41 |

FOREIGN PATENT DOCUMENTS

| | | |
|---|---|---|
| CN | 104276468 | 1/2015 |
| CN | 106185494 | 12/2016 |
| WO | 9702474 | 1/1997 |
| WO | 2016085795 | 6/2016 |

OTHER PUBLICATIONS

Chen et al., "People Counting System for Getting In/Out of a Bus Based on Video Processing", http://ieeexplore.ieee.org/abstract/document/4696529/, Intelligent Systems Design and Applications, 2008, ISDA '08, Eighth International Conference, Nov. 26-28, 2008, 5 pages.

Mohamudally et al. (Estimating Free Space in an Elevator's Confined Environment, Department of Computer Science and Networked Systems Sunway University Petaling Jaya, Malaysia, 2015 IEEE, pp. 1-6) (Year: 2015).

List of IBM Patents or Patent Applications Treated as Related, dated Nov. 12, 2019, 1 page.

Office Action issued in U.S. Appl. No. 15/844,884 dated Nov. 20, 2019, 26 pages.

Notice of Allowance issued in U.S. Appl. No. 15/844,884 dated Feb. 11, 2020, 13 pages.

* cited by examiner

| | MINIMUM OCCUPANCY AREA OF PERSON |
|---|---|
| P1 | 0.20 m² |
| P2 | 0.44 m² |
| P3 | 0.20 m² |

FIG. 9B

| TIME | # OF PEOPLE | MINIMUM OCCUPANCY AREAS | MAXIMUM OCCUPANCY AREAS | CENTER POSITIONS OF PASSENGERS | POSITIONAL INFORMATION OF FREE SPACES |
|---|---|---|---|---|---|
| 01/6/2017 9:00:00 | 3 | {P1(0.20 m²), P2(0.44 m²), P3(0.20 m²)} | {P1(1.25 m²), P2(1.49 m²), P3(1.25 m²)} | {P1(2,2), P2(2,7), P3(7,2)} | {(4,4),(4,5), (5,4)-(5,8), (6,5)-(6,8), (7,5)-(7,8), (8,5)-(8,8)} |
| 01/6/2017 9:00:05 | 3 | {P1(0.20 m²), P2(0.44 m²), P3(0.20 m²)} | {P1(1.25 m²), P2(1.49 m²), P3(1.25 m²)} | {P1(2,2), P2(2,7), P3(7,2)} | {(4,4),(4,5), (5,4)-(5,8), (6,5)-(6,8), (7,5)-(7,8), (8,5)-(8,8)} |
| 01/6/2017 9:00:10 | ... | ... | ... | ... | ... |

FIG. 9C

PRESENTING AN IMAGE INDICATING A POSITION FOR A PERSON IN A LOCATION THE PERSON IS WAITING TO ENTER

BACKGROUND

The present invention generally relates to computing systems and, more particularly, to a system and method for presenting an image indicating a position for a person.

In a crowded area such as an elevator car, a train car, a room, or any other location, people may position themselves near an entrance to the crowded area, even though free space may be present in a rear portion or other portion of the crowded area. When multiple people position themselves near the entrance to the crowded area, entry of additional persons into the crowded area may be more difficult or more time consuming. Additionally, it may not be possible for the maximum number of persons to enter the crowded area as access to the free space may be blocked by the people positioned near the entrance.

When an area such as an elevator car, train car, room, or other location is not crowded, people may position themselves in a cluster rather than spreading out throughout the area. This may reduce the comfort of the people in the cluster and entry of additional persons into the area may be more difficult or more time consuming.

SUMMARY

In a first aspect of the invention, there is a method that includes: determining, by a computing device, at least one free space in a location using at least one camera; determining, using the computing device, a new position for a first person in the location based upon the determined at least one free space in the location; and presenting an image to indicate the determined new position for the first person in the location.

In another aspect of the invention, there is a computer program product that includes a computer readable storage medium having program instructions embodied therewith. The program instructions are executable by a computing device to cause the computing device to: determine a number of persons waiting to enter a location; determine at least one free space in the location using at least one camera; determine a position in the location for at least one of the persons waiting to enter the location based on the determined at least one free space in the location; and present an image to indicate the determined position in the location for at least one of the persons waiting to enter the location.

In another aspect of the invention, there is a system that includes: a hardware processor, a computer readable memory, and a computer readable storage medium associated with a computer device; at least one camera; program instructions of a free space determiner configured to determine at least one free space in a location using the at least one camera; program instructions of a new position determiner configured to determine, for a first person in the location, a new position based upon the at least one free space in the location determined by the free space determiner; and program instructions of an image presenter configured to present an image in the location to indicate the new position for the first person in the location determined by the new position determiner.

BRIEF DESCRIPTION OF THE DRAWINGS

The present invention is described in the detailed description which follows, in reference to the noted plurality of drawings by way of non-limiting examples of exemplary embodiments of the present invention.

FIG. 9B depicts information about the example elevator car of FIG. 9A that the system may determine using a scanner in accordance with aspects of the invention.

FIG. 9C depicts information about the example elevator car of FIG. 9A that the system may determine using one or more cameras and the scanner in accordance with aspects of the invention.

DETAILED DESCRIPTION

Figure 1:
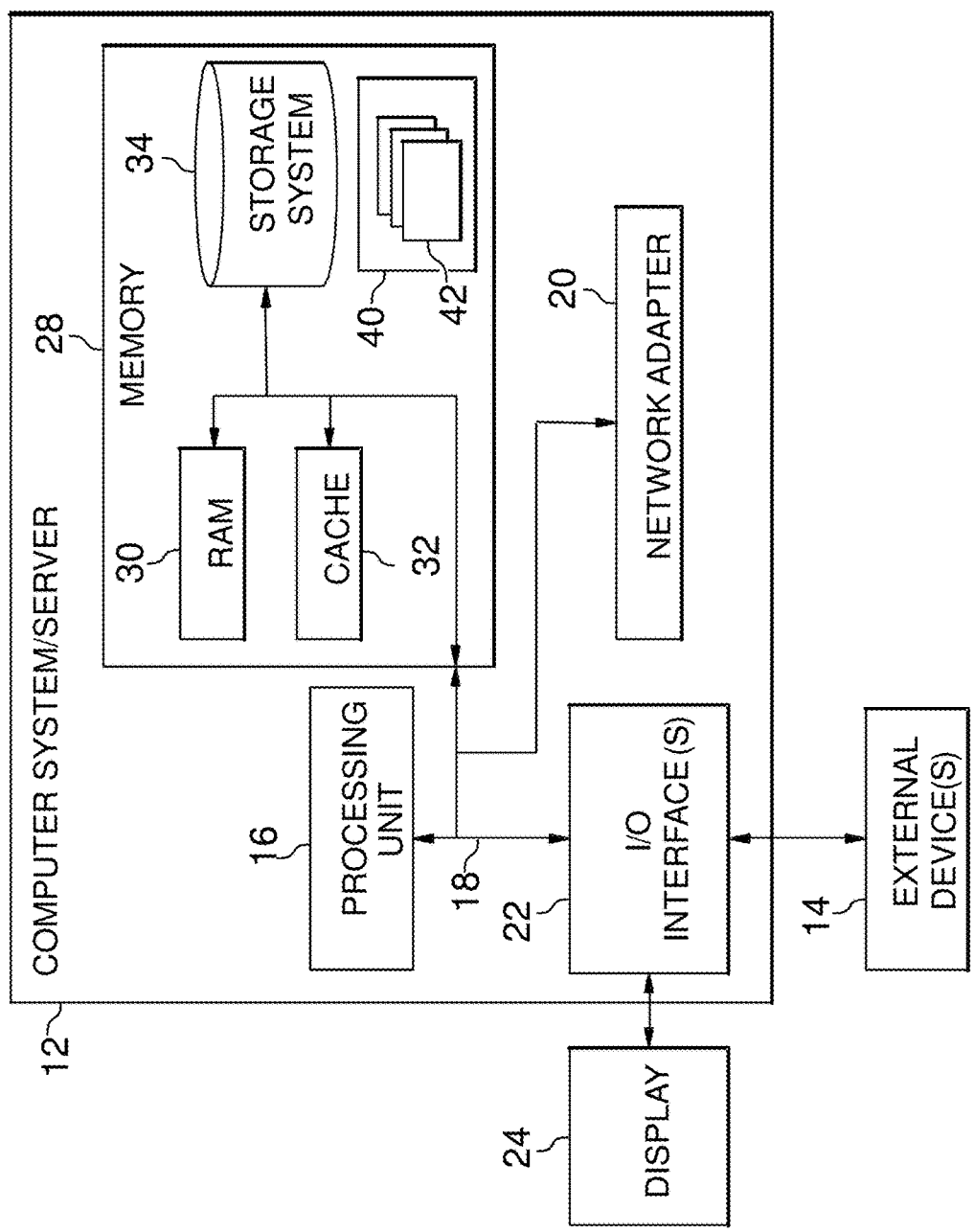
FIG. 1 depicts a computer system in accordance with aspects of the invention.

The present invention generally relates to computing systems and, more particularly, to a system and method for presenting an image indicating a position for a person. Aspects of the invention are directed to displaying a position (e.g., a standing area) for a person in an area such as an elevator car, a train car, a room, or any other location using an image (e.g., a footprint projection). Other aspects of the invention are directed to computing a density and/or number of persons in an area using sensors and/or cameras, evaluating existing positions (e.g., standing positions) of the persons in the area based on the density and/or number of persons, and displaying one or more footprints or other images on the floor to be followed by one or more of the persons to new positions in the area. The new positions may be determined taking into account an amount of space occupied by each of the persons (e.g., taking into account a size of each of the persons or the clothes of each of the persons). Additional aspects of the invention are directed to first displaying a footprint or other image near a foot of a particular person to indicate that that person is to follow the footprint or other image, and then moving the footprint or other image to a new standing position to direct the particular person to the new standing position.

As described herein, aspects of the invention may direct persons in an area to new positions that may facilitate the entry of one or more additional persons into the area. Additionally, aspects of the invention may direct persons waiting to enter the area to positions inside the area. Accordingly, these aspects of the invention may speed the entry of persons into the area and/or allow a larger number of persons to enter the area.

Other aspects of the invention may direct persons in an area to new positions in free space in the area so that persons are not clustered together or standing unnecessarily close to one another. Accordingly, these aspects of the invention may increase the comfort of one or more persons in the area by increasing an amount of personal space (i.e., open space) surrounding one or more persons in the area.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to FIG. 1, a schematic of an example of a computing infrastructure is shown. Computing infrastructure 10 is only one example of a suitable computing infrastructure and is not intended to suggest any limitation as to the scope of use or functionality of embodiments of the invention described herein. Regardless, computing infrastructure 10 is capable of being implemented and/or performing any of the functionality set forth hereinabove.

In computing infrastructure 10 there is a computer system (or server) 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in computing infrastructure 10 is shown in the form of a general-purpose computing device. The components of computer system 12 may include, but are not limited to, one or more processors or processing units (e.g., CPU) 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Figure 2:
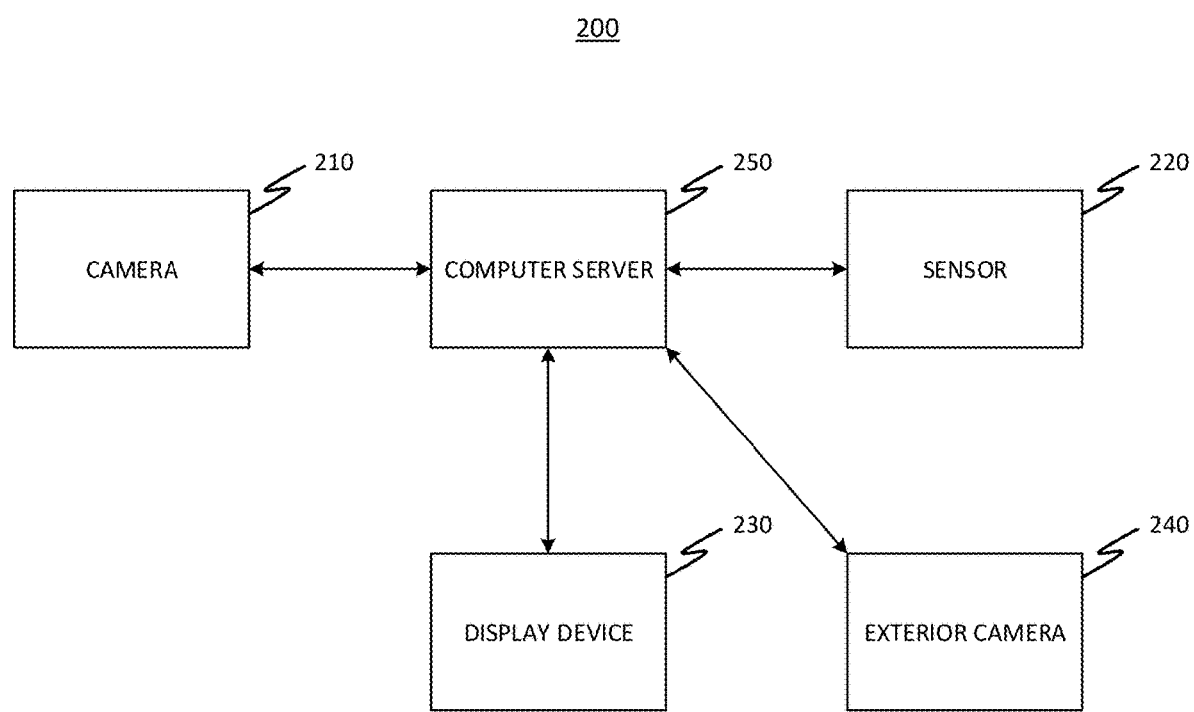
FIG. 2 depicts a block diagram of a system in accordance with aspects of the invention.

FIG. 2 depicts a block diagram of a system 200 in accordance with aspects of the invention. As shown, system 200 comprises a server 250, which according to an embodiment may be a computer server 12 as shown in FIG. 1. The server 250 is in communication with one or more cameras 210, one or more sensors 220, or a combination of one or more cameras 210 and one or more sensors 220.

In embodiments, the cameras 210 and sensors 220 are configured to obtain images of an area and information about a number of persons, locations of persons, sizes of persons, and free spaces in the area, as described herein. This data is transmitted to and used by the server 250 to determine new positions for persons in the area. The cameras 210 and sensors 220 may be directly connected to the server 250 via a Universal Serial Bus (USB) or other direct connection, connected via a LAN, or connected via the Internet or another network. The connection between the cameras 210 and sensors 220 and the server 250 may be a wired connection or a wireless connection. According to another embodiment, the system 200 may omit the cameras 210 or the sensors 220.

In embodiments, the cameras 210 may be digital still cameras, digital video cameras, thermographic cameras, or any other type of camera. A number of cameras 210 may be proportional to a ceiling area of the area. According to an embodiment, one camera 210 may be provided per one square meter of ceiling area. For example, if the ceiling area is four square meters, four cameras 210 are required and each camera 210 is placed in the center of each one square meter area.

In embodiments, the sensors 220 may be placed above and over a center of an entrance to the area. The sensors 220 may be any type of device capable of determining a planar surface area of persons entering the area through the entrance.

Operations of various embodiments are described below as using one or more cameras 210 and/or one or more sensors 220. However, other embodiments may only use one or more cameras 210 or may only use one or more sensors 220. Operations described herein as being performed by one or more cameras 210 may instead be performed by one or more sensors 220. Additionally, operations described herein as being performed by one or more sensors 220 may instead be performed by one or more cameras 210.

The server 250 is also in communication with one or more display devices 230. In embodiments, the display devices 230 are configured to project or display one or more images to indicate positions for persons in an area, as described herein. The display devices 230 may be directly connected to the server 250 via a USB or other direct connection, connected via a LAN, or connected via the Internet or another network. In embodiments, the server 250 is configured to transmit images to the display devices 230 to display in the area to indicate positions for persons, as described herein. In embodiments, the display device 230 may be any type of device capable of projecting an image onto a surface or displaying an image on a surface, including but not limited to a digital projector, a liquid crystal display (LCD) screen, or an organic light emitting diode (OLED) screen. The display device 230 may be positioned such that the one or more images projected or displayed by the display device 230 covers all or substantially all of a floor of the area.

Additionally, the server 250 may be in communication with one or more exterior cameras 240. The exterior cameras 240 may be configured to obtain images of persons waiting to enter the area (e.g., persons waiting near an entrance to the area or in a queuing area or other waiting area) and information about a number of the persons, locations of the persons, and sizes of the persons. The exterior cameras 240 may be directly connected to the server 250 via a USB or other direct connection, connected via a LAN, or connected via the Internet or another network.

In embodiments, the exterior cameras 240 may be digital still cameras, digital video cameras, thermographic cameras, or any other type of camera. A number of exterior cameras 240 may be proportional to a ceiling area of the queuing area or other waiting area. According to an embodiment, one exterior camera 240 may be provided per one square meter of ceiling area. For example, if the ceiling area is four square meters, four exterior cameras 240 are required and each exterior camera 240 is placed in the center of each one square meter area.

According to another embodiment, the system 200 may omit the exterior cameras 240. According to still another embodiment, exterior sensors may be used instead of or in addition to the exterior cameras 240. The exterior sensors may function in the same manner as the interior sensors 220, as described above.

Figure 3A:
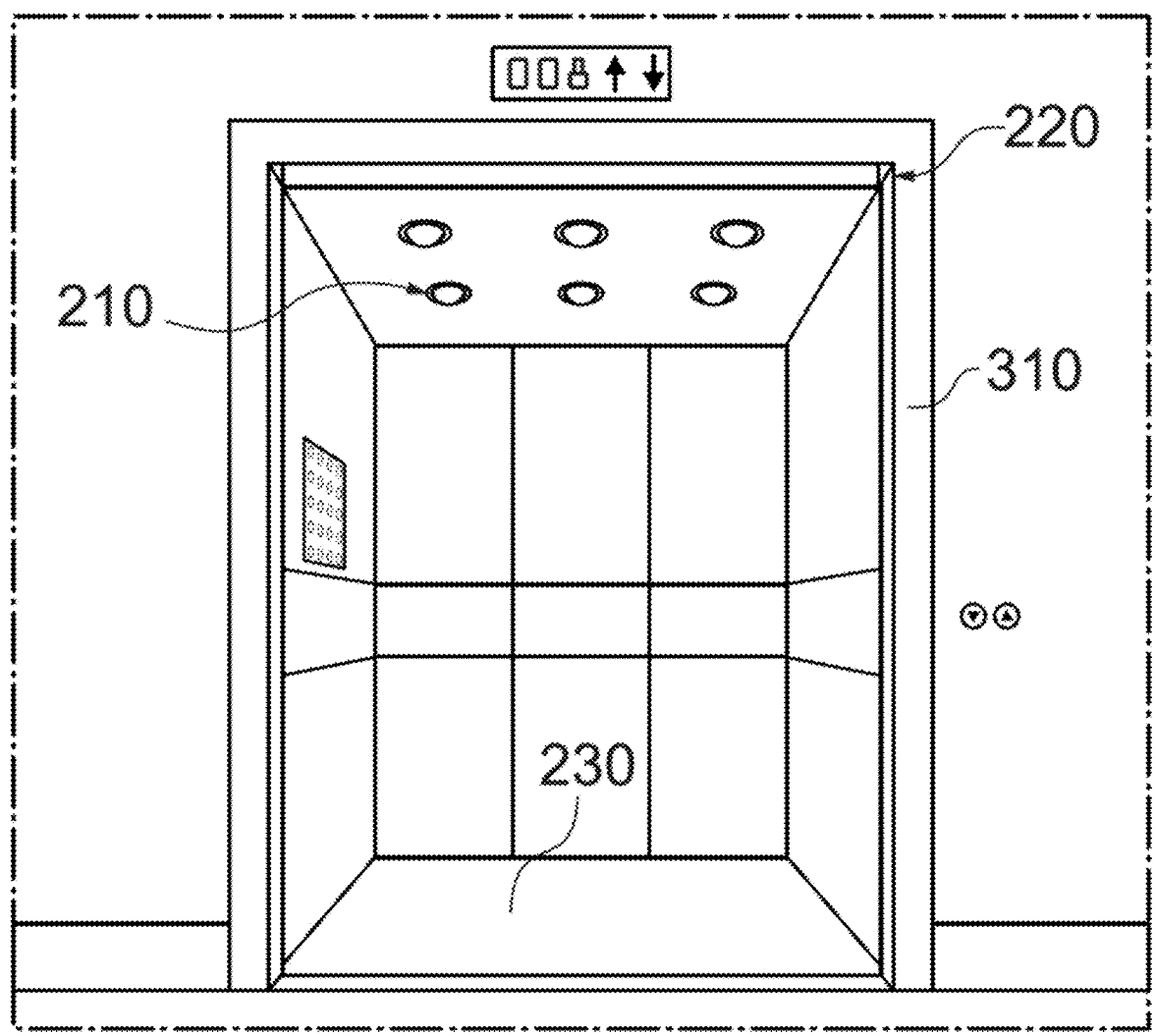
FIGS. 3A and 3B depict illustrative environments in accordance with aspects of the invention.
Figure 3B:
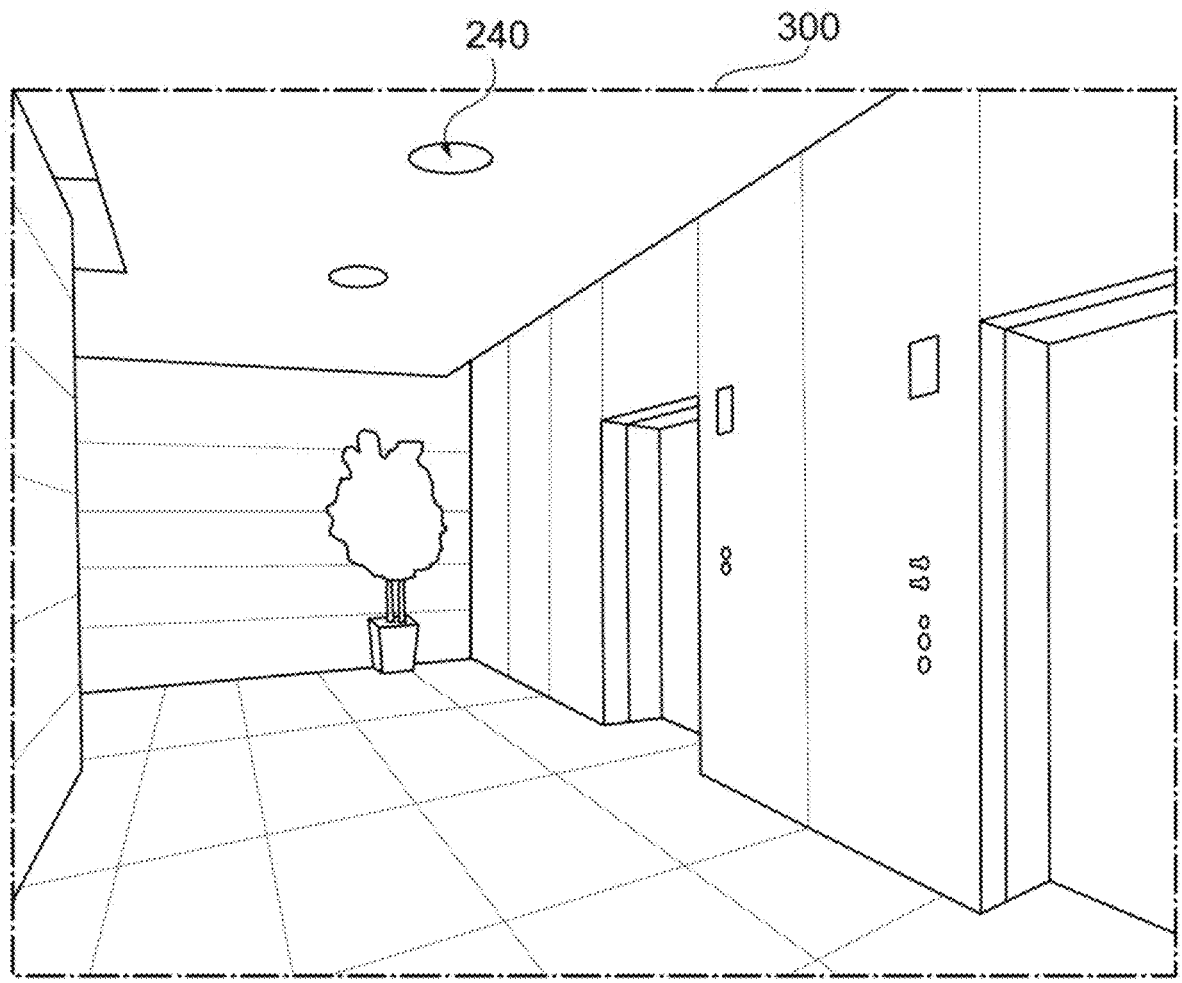

FIGS. 3A and 3B depict illustrative environments in accordance with aspects of the invention. The cameras 210 and the sensors 220 of the system 200 illustrated in FIG. 2 may be located inside an area such as an elevator car, a train car, a room, or any other location where the system is to display the standing areas, such as inside the elevator car 310 as illustrated in FIG. 3A. Alternatively, the cameras 210 and the sensors 220 may be positioned in a location outside of but having visibility into the area, or in a combination of the aforementioned locations. For example, the cameras 210 and the sensors 220 may be positioned outside of the elevator car 310 in a location having visibility into the elevator car 310.

The number of cameras 210 may be determined based on a size of the area and such that a number of persons therein as well as the locations and sizes of free spaces (i.e., spaces that are not occupied by any person) therein may be determined or approximated using the cameras 210. The cameras 210 may be positioned on a ceiling in the area such that the cameras capture images of the area and persons therein. Alternatively, the cameras 210 may be positioned on walls or in other locations in the area such that the cameras capture images of the area and persons therein.

The sensors 220 may be positioned on a ceiling of the area such that a size of each person therein may be determined. According to an embodiment, the sensors 220 may be positioned in or near an entrance to the area so that a minimum occupancy area (e.g., a size) of each person entering may be determined. For example, the sensors 220 may include any of the above-mentioned sensor types and may be positioned in the ceiling and near the entrance to the elevator car 310, as illustrated in FIG. 3A. Alternatively, the sensors 220 may be positioned on walls or in other locations in the area such that the sensors 220 obtain information regarding a size of each person in or entering the area.

The one or more display devices 230 may be configured to display an image on a floor of the area where the system is to display the standing areas. For example, the one or more display devices 230 may be configured to project or display an image on a floor of the elevator car 310 as illustrated in FIG. 3A.

Optionally, the server 250 may be in communication with one or more exterior cameras 240 which are positioned outside of the area where the system is to display the standing areas. For example, the one or more exterior cameras 240 may be positioned in the elevator lobby 300 as illustrated in FIG. 3B, which may be outside of the elevator car 310 illustrated in FIG. 3A. The exterior cameras 240 may be configured to obtain images of persons waiting to enter the elevator car 310 (e.g., persons waiting near an entrance to the area or in a queuing area or other waiting area) and information about a number of the persons, locations of the persons, and sizes of the persons positioned near an entrance to the area where the system is to display the standing areas or in a queuing area or other waiting area for the area where the system is to display the standing areas. The number of exterior cameras 240 installed near the entrance to or in the queuing area for the area where the system is to display the standing areas may be determined based on a size of the area near the entrance or the queuing area and such that a number of persons in the area near the entrance or the queuing area may be determined or approximated. The particular locations of the exterior cameras 240 installed near the entrance to or in the queuing area for the elevator car, train car, room, or other location may be determined based on the number of the exterior cameras 240 and the capabilities and performance characteristics thereof. The exterior cameras 240 may be connected to the computer server 12 via any type of wired or wireless connection, either directly or via a network such as the Internet or a LAN.

Figure 4:
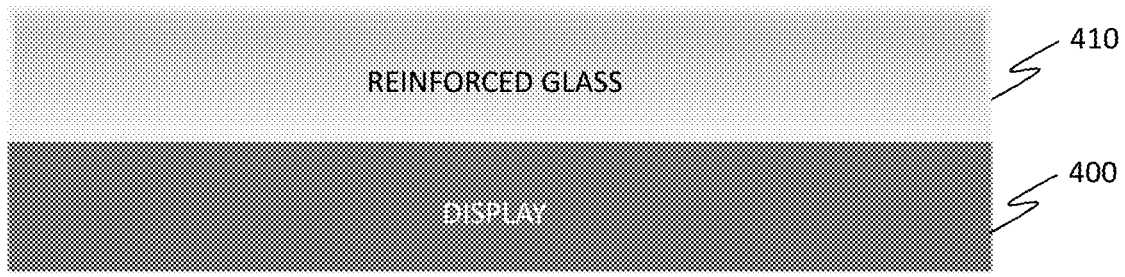
FIG. 4 depicts a configuration of a display device on or under a floor in accordance with aspects of the invention.

FIG. 4 depicts a configuration of a display device 230 on or under a floor in accordance with aspects of the invention. According to an embodiment, the display device 230 of the system 200 of FIG. 2 may be a display device 400, as illustrated in FIG. 4, that is installed on or under the floor of the area, and reinforced glass 410 or another protective surface may be installed above the display device 400 such that persons in the area stand on the reinforced glass 410 or other protective surface rather than directly on the display device 400.

Figure 5:
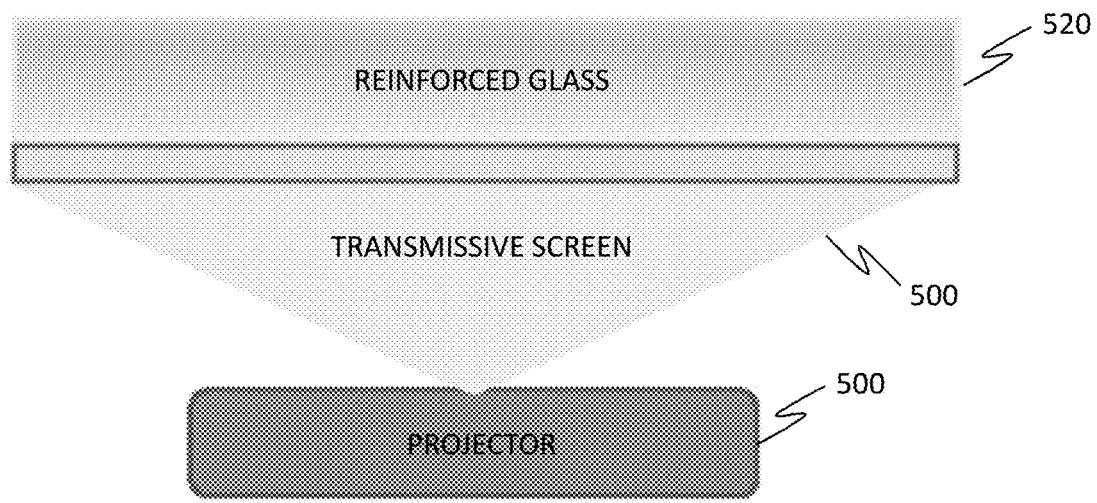
FIG. 5 depicts another configuration of a display device on or under a floor in accordance with aspects of the invention.

FIG. 5 depicts another configuration of a display device 230 on or under a floor in accordance with aspects of the invention. According to another embodiment, the display device 230 of the system 200 of FIG. 2 may be a digital projector 500, as illustrated in FIG. 5, that is installed under the floor of the area and configured such that the digital projector 500 projects an image onto a transmissive projection screen 510 located between the digital projector 500 and the floor of the area. Reinforced glass 520 or another protective surface may be installed above the projection screen 510 such that persons in the area stand on the reinforced glass 520 or other protective surface rather than directly on the projection screen 510.

The one or more display devices 230 may also include an additional display device configured to display or project images or other visual signals in other locations in the area. This additional display device may provide an additional indication to alert persons in the area regarding the new standing positions. Alternatively, instead of or in addition to the additional display device, the system 200 may include a speaker that may provide a voice announcement, tone, or other sound as an additional indication to alert persons in the area regarding the new standing positions. For example, the speaker may announce, "please check the floor at your feet."

Figure 6:
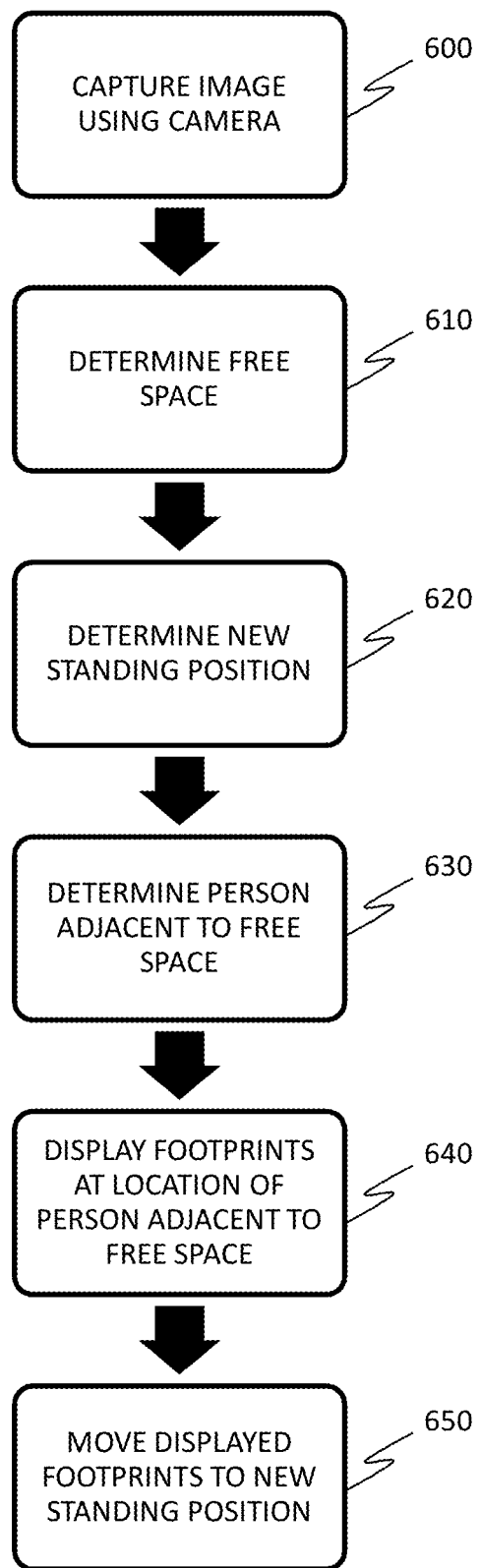
FIG. 6 depicts an exemplary method for presenting an image to direct a person to a new position in an area that may facilitate the entry of one or more additional persons into the area, in accordance with aspects of the invention.

FIG. 6 depicts an exemplary method for presenting an image to direct a person to a new position in an area that may facilitate the entry of one or more additional persons into the area, in accordance with aspects of the invention. The steps of the method may be performed in the computer system of FIG. 1, the system of FIG. 2, and the environment illustrated in FIGS. 3A and 3B and are described with reference to the elements and steps described with respect to FIGS. 1, 2, 3A, and 3B.

At step 600, the system 200 captures an image using a camera. In embodiments, the system 200 captures one or more images of an area such as an elevator car, train car, room, or other location using the one or more cameras 210. The one or more cameras 210 in the ceiling of the elevator car 310 illustrated in FIG. 3A may obtain images of the elevator car 310 including any persons therein. These images are transmitted from the one or more cameras 210 to the server 250 via any type of wired or wireless connection, either directly or via a network such as the Internet or a LAN.

At step 610, the system 200 determines a free space. In embodiments, the system 200, using the server 250, analyzes the images captured at step 600 to identify areas in the images having the color of the floor, and deems these areas to be free spaces in the area. For example, the server 250 may be programmed with image processing algorithms that are configured to determine free spaces in the area based upon a preregistered color code of the floor. For example, if the color code of the floor, #808080, is preregistered, and the image processing algorithm detects a color other than the preregistered color code (#808080) in the images captured at step 600, the image processing algorithms may determine that the area in the images captured at step 600 that is not the color #808080 is not a free space. Additionally, the image processing algorithm may determine that the area in the images captured at step 600 that is the color #808080 is a free space.

At step 620, the system 200 determines a new standing position. In embodiments, the system 200, using the server 250, determines a new standing position inside the free space determined at step 610, as described herein with respect to FIGS. 9A-12.

At step 630, the system 200 determines a person adjacent to the free space determined at step 610. In embodiments, the system 200, using the server 250, uses image processing to determine a person in front of the free space ("front" referring to a side nearest an entrance to the area, and "back" referring to a side farthest from the entrance to the area). If multiple free spaces exist, the system 200 may determine the person in front of the free space located farthest from the entrance to the area.

At step 640, the system 200 displays footprints at a location of a person adjacent to the free space. In embodiments, the system 200, using the server 250, causes the display device 230 to display footprints at a location of the person determined at step 630 who is adjacent to the free space determined at step 610. For example, the display device 230 may display footprints on or adjacent to the feet of the determined person adjacent to the free space.

At step 650, the system 200 moves the displayed footprints to a new standing position. In embodiments, the system 200, using the server 250, causes the display device 230 to display footprints at the new standing position determined at step 620 for the person determined at step 630. The footprints may be displayed moving between a current location of the person determined at step 630 and the new standing position determined at step 620 for the person determined at step 630. In this manner, the person determined at step 630 may be directed to a new position in the area that may facilitate the entry of one or more additional persons into the area.

Figure 7:
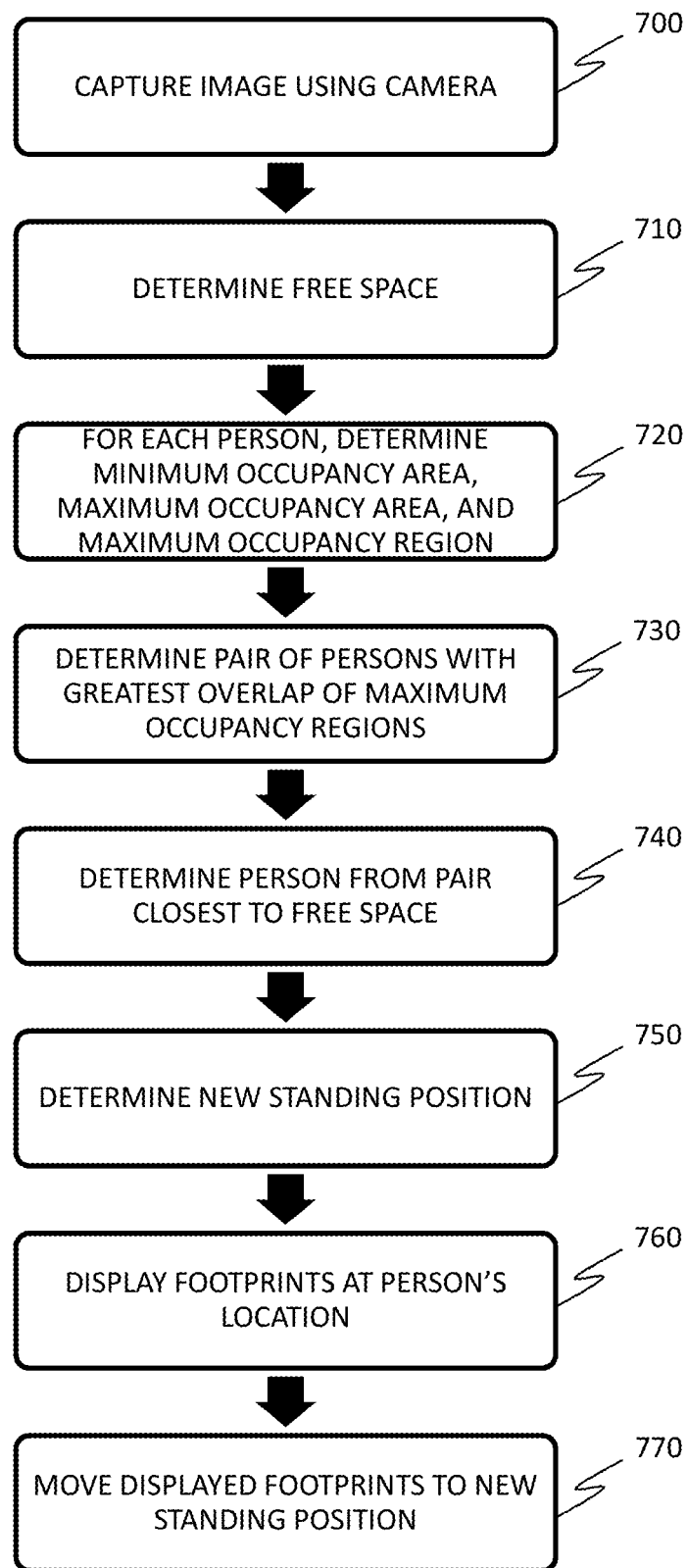
FIG. 7 depicts an exemplary method for presenting an image to direct a person to a new position in an area that may increase the comfort of one or more persons by increasing an amount of personal space, in accordance with aspects of the invention.

FIG. 7 depicts an exemplary method for presenting an image to direct a person to a new position in an area that may increase the comfort of one or more persons by increasing an amount of personal space, in accordance with aspects of the invention. The steps of the method may be performed in the computer system of FIG. 1, the system of FIG. 2, and the environment illustrated in FIGS. 3A and 3B and are described with reference to the elements and steps described with respect to FIGS. 1, 2, 3A, and 3B.

At step 700, the system 200 captures an image using a camera. In embodiments, the system 200 captures one or more images of an area such as an elevator car, train car, room, or other location using the one or more cameras 210.

The one or more cameras 210 in the ceiling of an elevator car 310 illustrated in FIG. 3A may obtain images of the elevator car 310 including any persons therein. These images are transmitted from the one or more cameras 210 to the server 250 via any type of wired or wireless connection, either directly or via a network such as the Internet or a LAN. The system 200 may also capture data from the sensors 220, as described above, and transmit the data to the server 250 via any type of wired or wireless connection, either directly or via a network such as the Internet or a LAN.

At step 710, the system 200 determines a free space. In embodiments, the system 200, using the server 250, analyzes the images captured at step 700 to identify areas in the images having the color of the floor, and deems these areas to be free spaces in the area. For example, the server 250 may be programmed with image processing algorithms that are configured to determine free spaces in the area as described above with respect to FIG. 6.

At step 720, the system 200, for each person, determines a minimum occupancy area, a maximum occupancy area, and a maximum occupancy region. In embodiments, for each person in the area, the system 200, using the server 250, determines a minimum occupancy area of the person, as described herein, based on the one or more images of the area captured using the one or more cameras 210 and/or data regarding sizes of persons received from the one or more sensors 220 at step 700. Additionally, the system 200, using the server 250, determines a maximum occupancy area for each person, as described herein, based on the free spaces determined at step 710 and the determined minimum occupancy area of the person. Furthermore, the system 200, using the server 250, determines a maximum occupancy region of the person corresponding to the maximum occupancy area, as described herein.

At step 730, the system 200 determines a pair of persons with a greatest overlap of maximum occupancy regions. In embodiments, the system 200, using the server 250, determines the pair of persons with the greatest overlap of maximum occupancy regions based on the maximum occupancy areas and maximum occupancy regions determined at step 720.

At step 740, the system 200 determines a person from the pair that is closest to the free space. In embodiments, the system 200, using the server 250, determines the person from the pair of persons determined at step 730 who is closest to a free space determined at step 710. If multiple free spaces were determined at step 710, the system 200 may use the free space that is located farthest from the entrance to the area.

At step 750, the system 200 determines a new standing position. In embodiments, the system 200, using the server 250, determines the new standing position in the free space determined at step 710 for the person from the pair of persons determined at step 740 who is closest to the free space. The new standing position is determined such that an overlapping area of the person with other persons is smallest.

At step 760, the system 200 displays footprints at a person's location. In embodiments, the system 200, using the server 250, causes the display device 230 to display footprints at a location of the person determined at step 740. For example, the display device 230 may display footprints on or adjacent to the feet of the determined person.

At step 770, the system 200 moves the displayed footprints to the new standing position. In embodiments, the system 200, using the server 250, causes the display device 230 to display footprints at the new standing position in the free space as determined at step 750 for the person determined at step 740. The footprints may be displayed moving between the location of the determined person adjacent to the free space and the new standing position in the free space for the determined person. In this manner, the person determined at step 740 may be directed to a new position in the area that may increase the comfort of one or more persons by increasing an amount of personal space.

Figure 8:
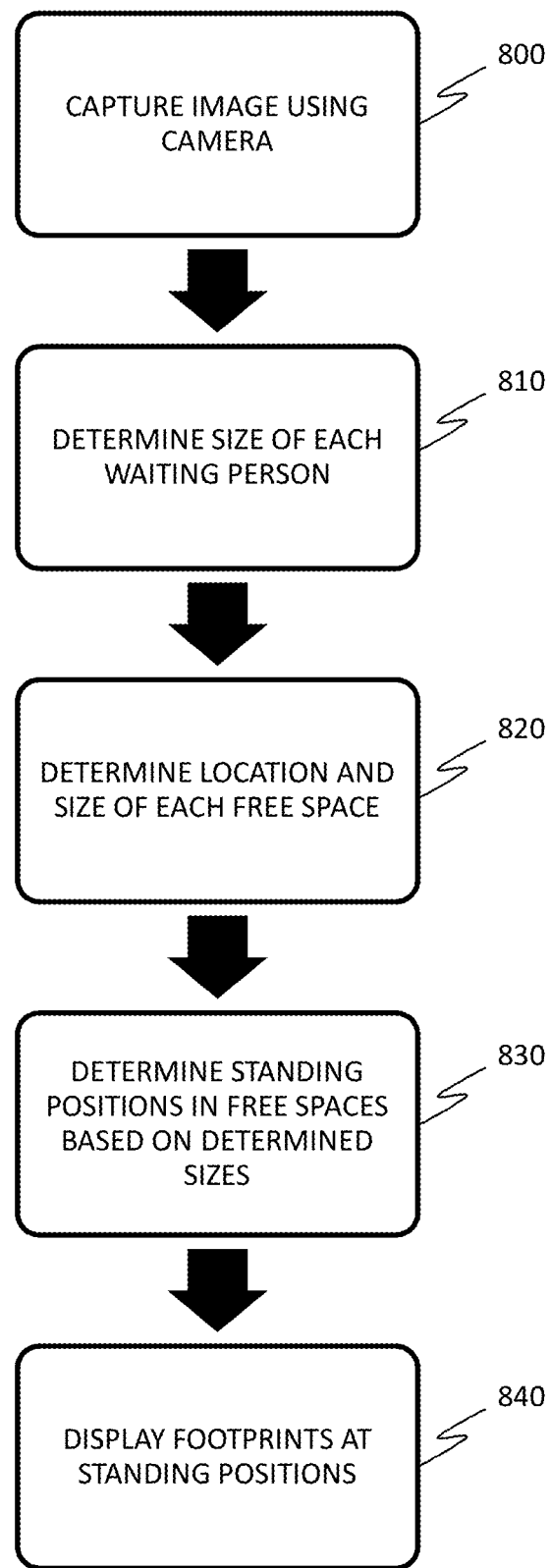
FIG. 8 depicts an exemplary method for presenting an image to direct a person in a waiting area to a free space in an area, in accordance with aspects of the invention.

FIG. 8 depicts an exemplary method for presenting an image to direct a person in a waiting area to a free space in an area, in accordance with aspects of the invention. The steps of the method may be performed in the computer system of FIG. 1, the system of FIG. 2, and the environment illustrated in FIGS. 3A and 3B and are described with reference to the elements and steps described with respect to FIGS. 1, 2, 3A, and 3B.

At step 800, the system 200 captures images using a camera. In embodiments, the system 200 captures one or more images of a queuing area or other waiting area for an elevator car, train car, room, or other location where the system 200 is to display the standing areas, using one or more exterior cameras 240. For example, one or more exterior cameras 240 in the ceiling of an elevator lobby 300 illustrated in FIG. 3B may obtain images of the elevator lobby 300 including any persons therein. These images may be transmitted from the one or more exterior cameras 240 to the server 250 via any type of wired or wireless connection, either directly or via a network such as the Internet or a LAN.

At step 810, the system 200 determines a size of each waiting person. In embodiments, the system 200, using the server 250, analyzes the images captured at step 800 to determine an approximate number of persons in the queuing area or other waiting area and an approximate size of each of the persons in the queuing area or other waiting area. For example, the server 250 may be programmed with image processing algorithms that are configured to determine an approximate number of persons by determining a number of areas in the images captured at step 800 that are a different color than a preregistered color of the floor. Additionally, the server 250 may be programmed with image processing algorithms that are configured to determine an approximate size of each of the persons using a size of each of the areas in the images captured at step 800 that are a different color than a preregistered color of the floor. Alternatively, the system 200 may include a temperature sensor that detects a radiation temperature of a person, and the detected radiation temperature of the person may be used to determine the approximate size of the person. According to an embodiment, in determining the approximate number and sizes of persons, the system may only include persons who are in front of and/or facing an entrance to the area.

At step 820, the system 200 determines a location and size of each free space. In embodiments, the system 200 captures one or more images of the area using the one or more cameras 210. For example, one or more cameras 210 in the ceiling of an elevator car 310 illustrated in FIG. 3A may obtain images of the elevator car 310 including any persons therein. These images may be transmitted from the one or more cameras 210 to the server 250 via any type of wired or wireless connection, either directly or via a network such as the Internet or a LAN. The system 200, using the server 250, analyzes these captured images to identify locations and sizes of areas in the images having the color of the floor, and deems these areas to be free spaces in the area. For example, the server 250 may be programmed with image processing algorithms that are configured to determine free spaces in the area as described above with respect to FIG. 6.

At step 830, the system 200 determines standing positions in the free spaces based on the determined sizes. In embodiments, the system 200, using the server 250, determines standing positions in the area that are available for the persons in the queuing area or other waiting area, as determined using the location and sizes of free spaces in the area determined at step 820 as well as the number and size of the persons in the queuing area or other waiting area determined at step 810, as described herein with respect to FIGS. 9A-12.

At step 840, the system 200 displays footprints at standing positions. In embodiments, the system 200, using the server 250, causes the display device 230 to display footprints at the standing positions determined at step 830. The system may wait until one or more persons have exited from the area and the amount of free space is no longer increasing before displaying the footprints at the standing positions. According to an embodiment, the footprints may be displayed moving between the location of each person in the queuing area or other waiting area and the standing position for the person in the area. In this manner, a person in the waiting area may be directed to a free space in the area.

Figure 9A:
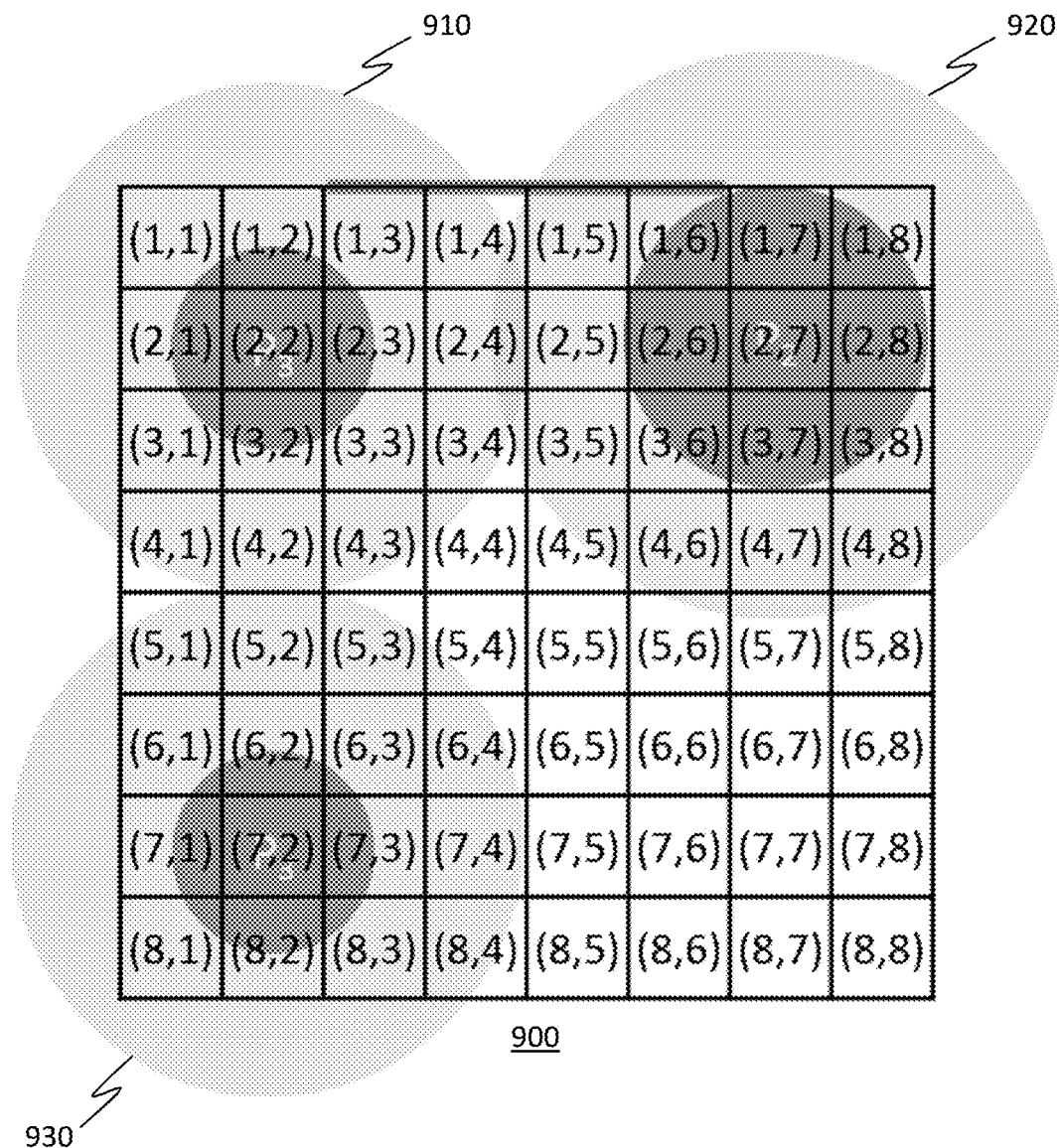
FIG. 9A shows a graphical depiction of an example of areas of an elevator car occupied by three persons.

FIG. 9A shows a graphical depiction of an example of areas of an elevator car 900 occupied by three persons, $P_1$ 910, $P_2$ 920, and $P_3$ 930. The floor of the elevator car 900 is represented by the 8 by 8 grid of FIG. 9A. For example, position (1,1) in the grid shown in FIG. 9A may represent the front left corner of the floor of the elevator car 900, position (1,8) may represent the front right corner, position (8,1) may represent the back left corner, and position (8,8) may represent the back right corner. Person $P_1$ 910 is centered at position (2,2) in the grid. In other words, person $P_1$ 910 is standing on the floor of the elevator car 900 near the front left corner. Person $P_2$ 920 is centered at position (2,7), and person $P_3$ 930 is centered at position (7,2). The inner circle surrounding each of persons $P_1$ 910, $P_2$ 920, and $P_3$ 930 depicts the person's minimum occupancy area (e.g., a minimum amount of space occupied by the person), and the outer circle depicts the person's maximum occupancy area (e.g., a maximum amount of space available and allowed to be occupied by the person; this may include the person's minimum occupancy area plus some amount of personal space surrounding the person).

FIG. 9B depicts information about the persons in the example elevator car 900 of FIG. 9A that the system 200 may determine using a scanner 220 in accordance with aspects of the invention. As illustrated in FIG. 9B, the scanner 220 may determine that $P_1$ 910 in the example elevator car depicted in FIG. 9A has a minimum occupancy area of 0.20 $m^2$, $P_2$ 920 has a minimum occupancy area of 0.44 $m^2$, and $P_3$ 930 has a minimum occupancy area of 0.20 $m^2$.

FIG. 9C depicts information about the example elevator car 900 of FIG. 9A that the system 200 may determine using one or more cameras 210 and the scanner 220 in accordance with aspects of the invention. In embodiments, using the images captured by the one or more cameras 210 and/or image data received from the scanner 220, the system 200 may determine a minimum occupancy area and a maximum occupancy area for each person, as described with respect to FIG. 12. This information may be updated each time a new image is received from the one or more cameras 210 and/or new data is received from the scanner 220.

Figure 10A:
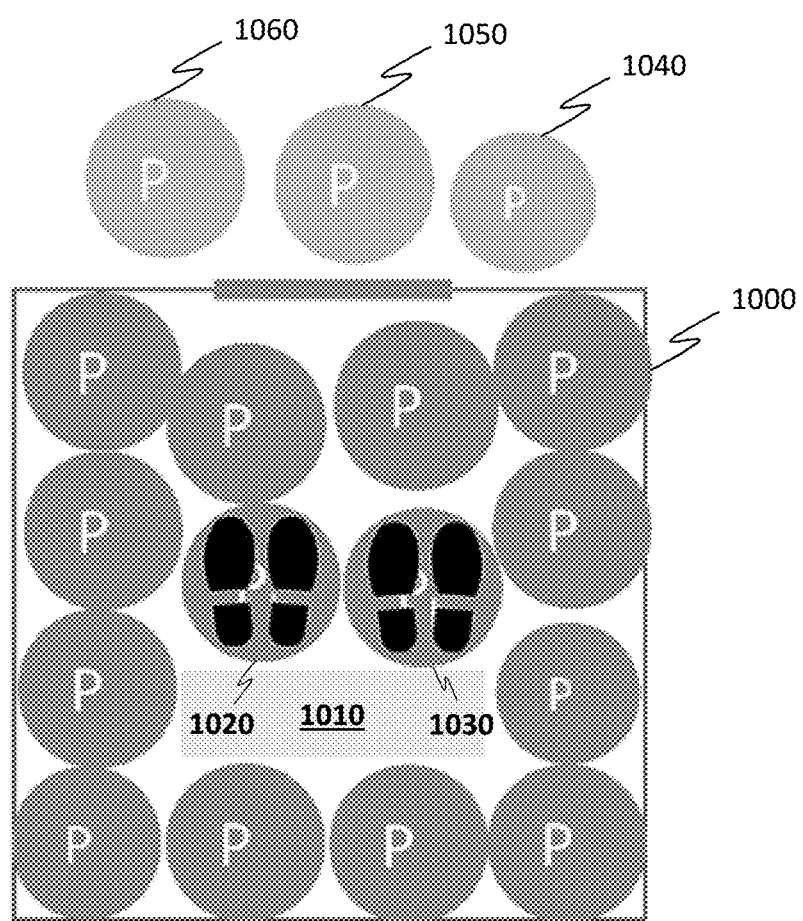
FIGS. 10A, 10B, 10C, 10D, and 10E illustrate an example of the system in operation in accordance with aspects of the invention.
Figure 10B:
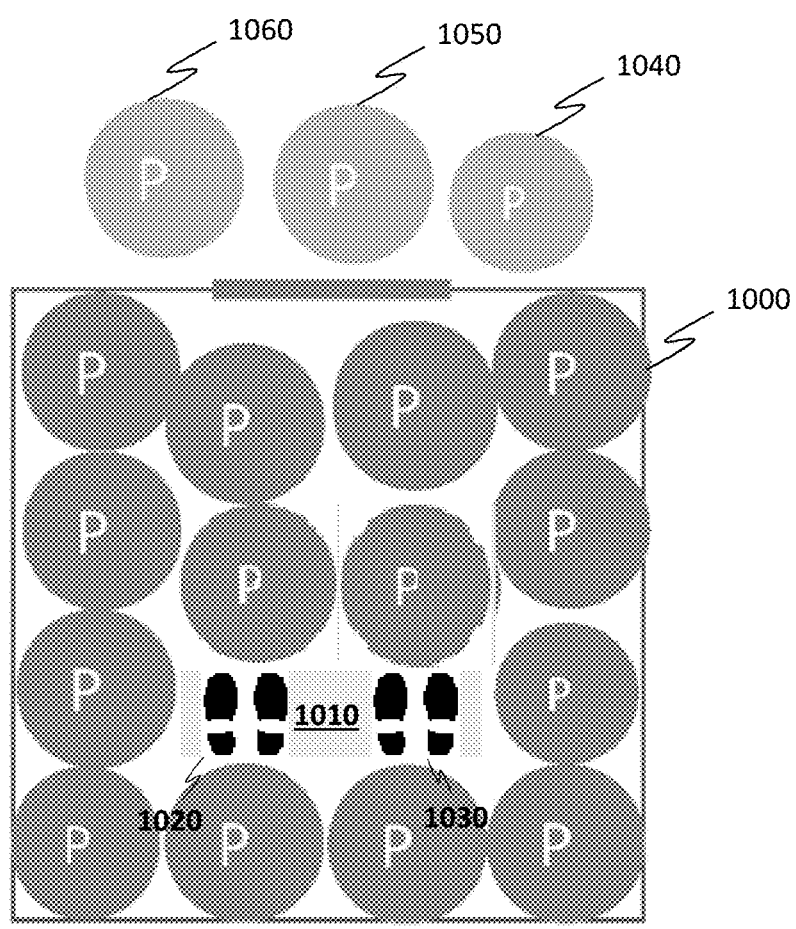

FIGS. 10A, 10B, 10C, 10D, and 10E illustrate an example of the system in operation in accordance with aspects of the invention. For example, FIG. 10A shows an elevator car that is crowded with persons 1000. As described above, using the one or more cameras 210 and the one or more sensors 220, the system 200, using the server 250, determines a number of persons waiting to enter the elevator car as well as a minimum occupancy area of each person 1040, 1050, 1060. The elevator car opens its door, and the system 200 waits for persons to finish exiting the elevator car. The system 200 then uses the server 250 to determine the density of the persons in the elevator car, and determines that the density is greater than or equal to a threshold value (i.e., the elevator car is crowded with persons 1000). The system 200 then uses the server 250 to analyze images captured by the one or more cameras 210, determine a free space 1010 in the elevator car, and display footprints 1020 and 1030 on or adjacent to the feet of persons in front of the free space 1010, as illustrated in FIG. 10A. The system 200 then moves the footprints 1020 and 1030 from the persons in front of the free space 1010 to the free space 1010, so as to lead the persons in front of the free space 1010 to move rearward to the free space 1010, as illustrated in FIG. 10B.

Figure 10C:
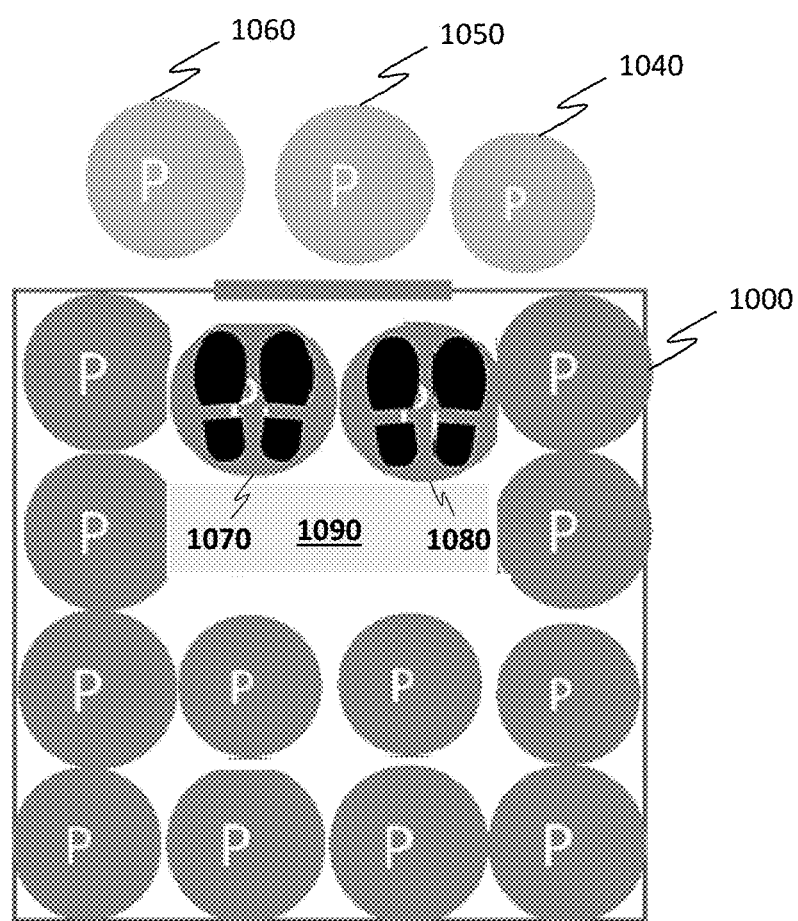
Figure 10D:
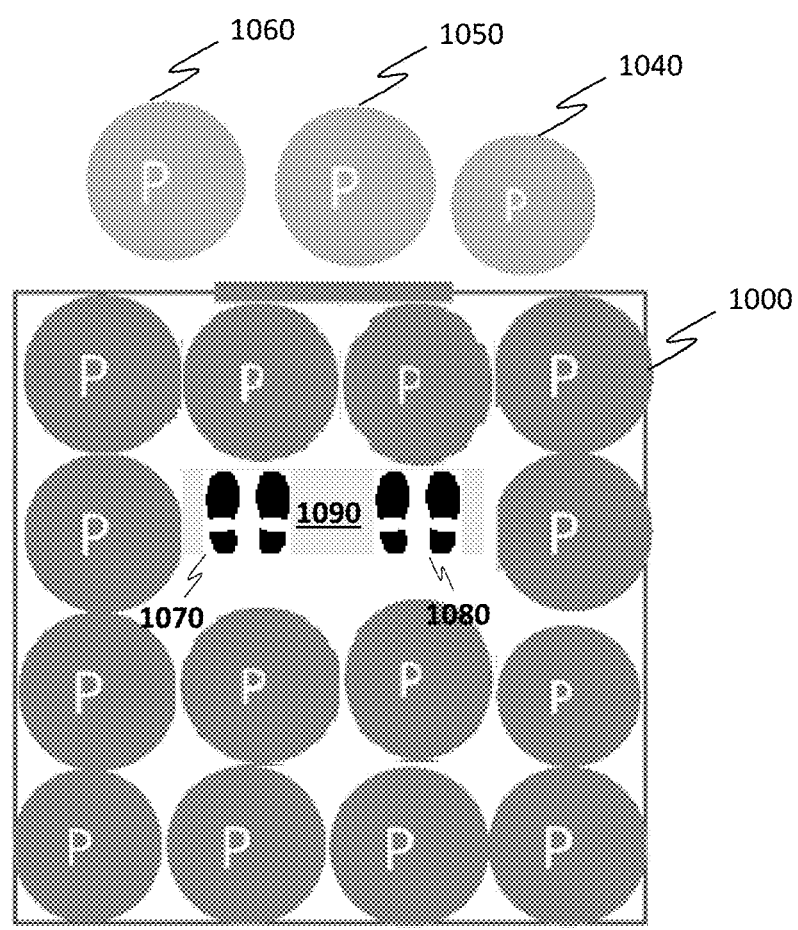
Figure 10E:
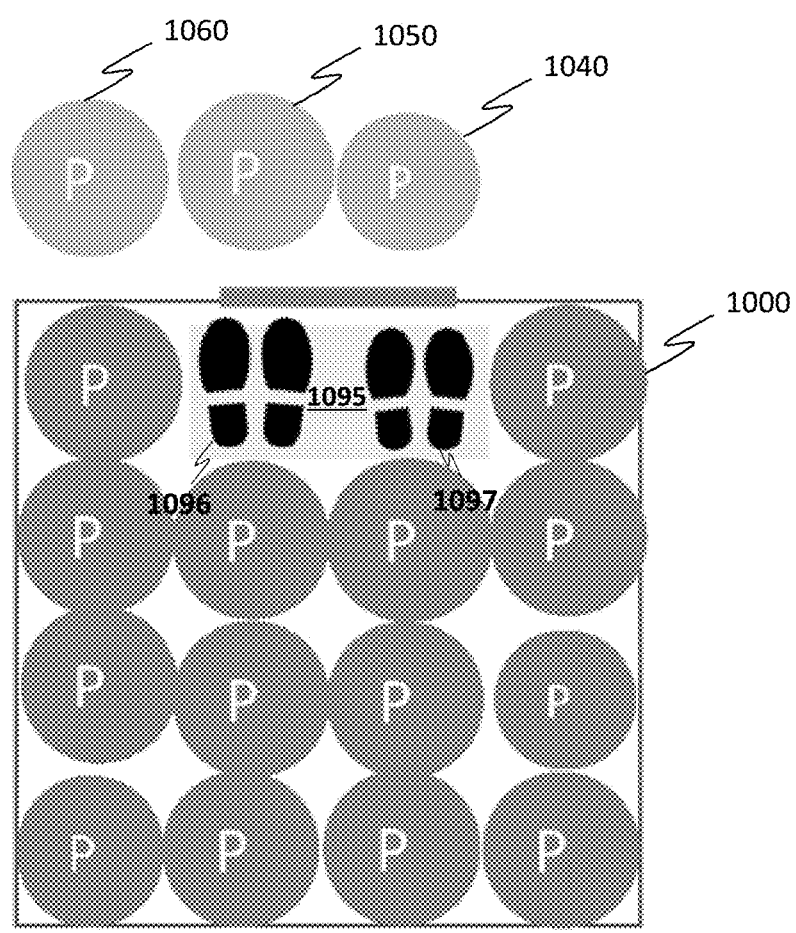

The system 200 once again uses the server 250 to analyze images captured by the one or more cameras 210, determine a free space 1090 in the elevator car, and display footprints 1070 and 1080 on or adjacent to the feet of persons in front of the free space 1090, as illustrated in FIG. 10C. The system 200 then moves the footprints 1070 and 1080 from the persons in front of the free space 1090 to the free space 1090, so as to lead persons in front of the free space 1090 to move rearward to the free space 1090, as illustrated in FIG. 10D. The system 200 once again uses the server 250 to analyze images captured by the one or more cameras 210, determine a free space 1095 in the elevator car, and display footprints 1096 and 1097 to indicate standing positions for two of the three persons 1040, 1050, 1060 waiting to enter the elevator car, as illustrated in FIG. 10E.

Figure 11:
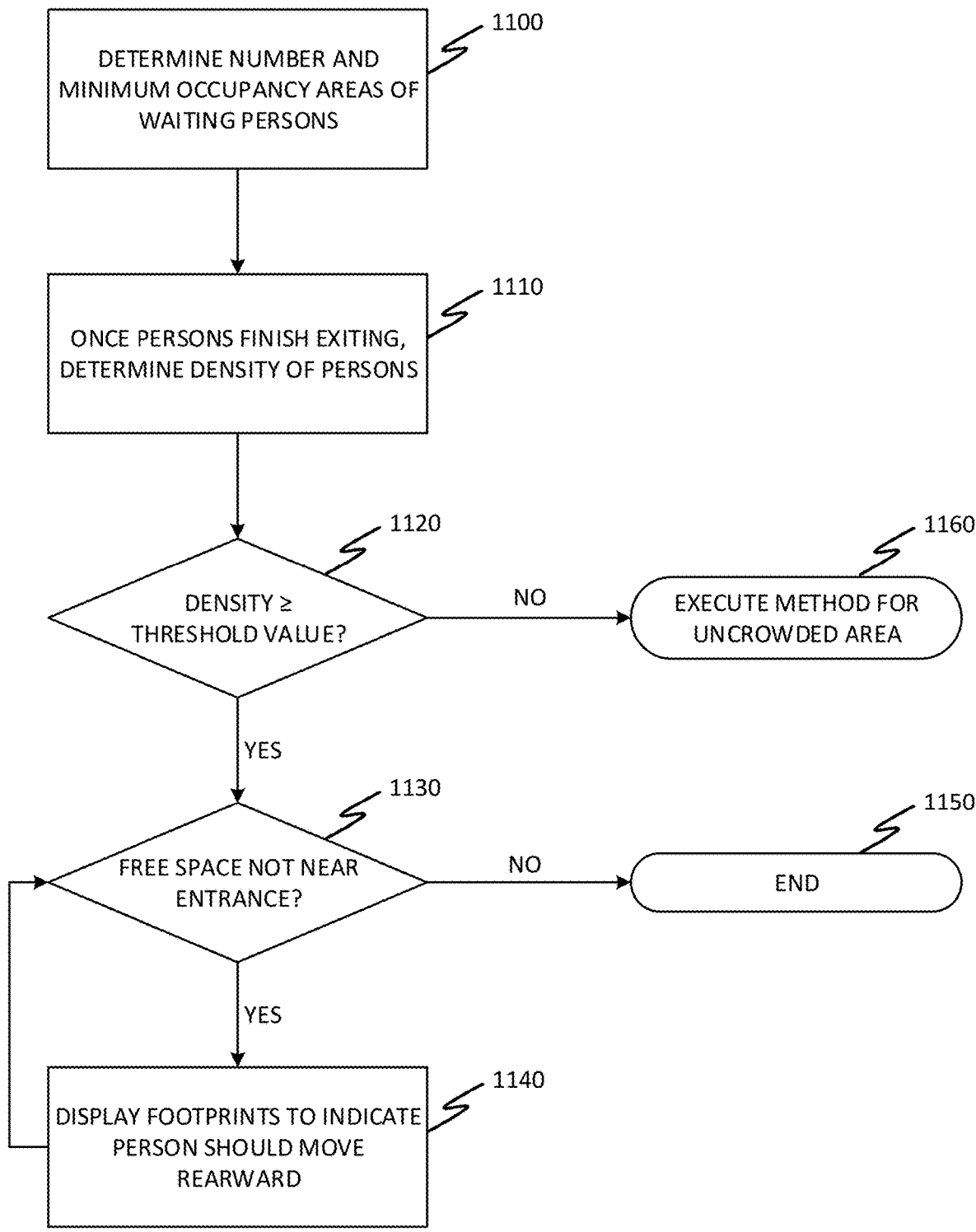
FIG. 11 depicts an exemplary method that may facilitate the entry of one or more additional persons into a crowded area, in accordance with aspects of the invention.

FIG. 11 depicts an exemplary method that may facilitate the entry of one or more additional persons into a crowded area, in accordance with aspects of the invention. The steps of the method may be performed in the computer system of FIG. 1, the system of FIG. 2, and the environment illustrated in FIGS. 3A and 3B and are described with reference to the elements and steps described with respect to FIGS. 1, 2, 3A, and 3B.

At step 1100, the system 200 uses the one or more exterior cameras 240 and the server 250 to determine a number of persons and a minimum occupancy area for each person waiting to enter an area such as an elevator car, train car, room, or other location, as described above. At step 1110, in response to an opening of a door to the area, once persons finish exiting the area, the system 200, using the one or more cameras 210, the one or more sensors 220, and the server 250, determines a density of persons in the area. For example, the system 200 may determine a number of persons in the area. The system 200 may also use the number of persons and minimum occupancy areas determined at step 1100 in determining the density of persons in the area.

At step 1120, the system 200, using the server 250, determines whether the density of persons in the area determined at step 1110 is greater than or equal to a predetermined threshold value (e.g., a crowding threshold). For example, the system 200 may determine whether a number of person in the area exceeds a predetermined number of persons. If the system 200 determines that the density is greater than or equal to the predetermined threshold value, then flow proceeds to step 1130. On the other hand, if the system 200 determines that the density is not greater than or equal to the predetermined threshold value, flow proceeds to step 1160, and the method for an uncrowded area is executed as illustrated in FIG. 12, starting at step 1220.

At step 1130, the system 200, using the server 250, analyzes images from the one or more cameras 210 to determine whether there is free space in the area that is not near an entrance to the area, as described herein. If the system 200 determines that there is free space in the area that is not near the entrance, then flow proceeds to step 1140. On the other hand, if the system 200 determines that there is not any such free space, then the system 200 proceeds to step 1150 and processing is completed. At step 1140, the system 200, using the server 250 and the display device 230, displays footprints to lead persons in front of the free space to move rearward, as described with respect to FIG. 6 and illustrated in FIGS. 10A, 10B, 10C, 10D, and 10E. The flow then returns to step 1130. In this manner, free space may be created near the entrance to the area to facilitate the entry of one or more additional persons into the area.

Figure 12:
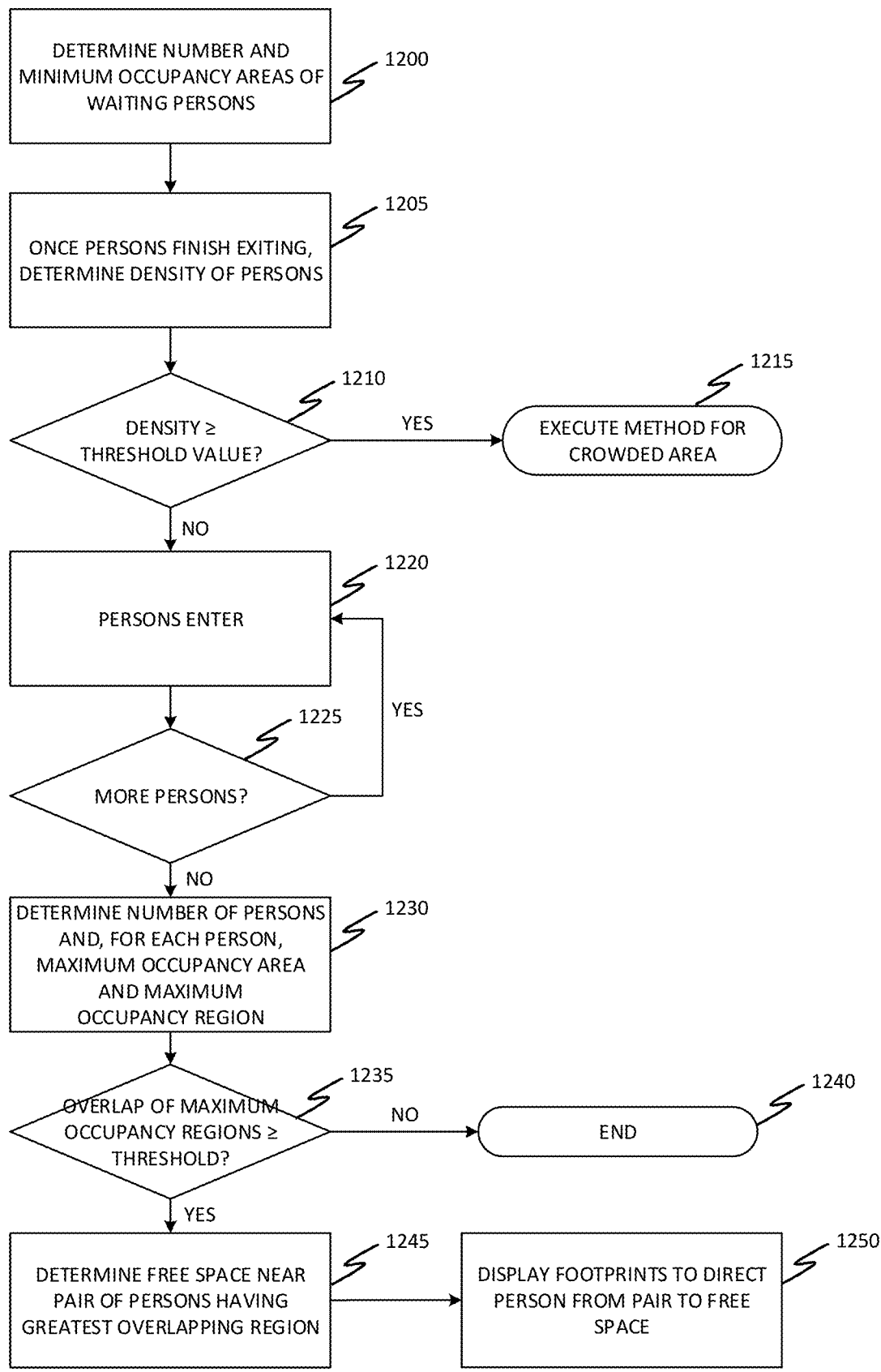
FIG. 12 depicts an exemplary method that may increase the comfort of one or more persons in an uncrowded area by increasing an amount of personal space, in accordance with aspects of the invention.

FIG. 12 depicts an exemplary method that may increase the comfort of one or more persons in an uncrowded area by increasing an amount of personal space, in accordance with aspects of the invention. The steps of the method may be performed in the computer system of FIG. 1, the system of FIG. 2, and the environment illustrated in FIGS. 3A and 3B and are described with reference to the elements and steps described with respect to FIGS. 1, 2, 3A, and 3B.

At step 1200, the system 200 uses the one or more exterior cameras 240 and the server 250 to determine a number of persons and a minimum occupancy area for each person waiting to enter an area such as an elevator car, train car, room, or other location, as described above. At step 1205, in response to an opening of a door to the area, after persons finish exiting the area, the system 200, using the one or more cameras 210, the one or more sensors 220, and the server 250, determines a density of persons in the area. For example, the system 200 may determine a number of persons in the area. The system 200 may also use the number of persons and minimum occupancy areas determined at step 1200 in determining the density of persons in the area.

At step 1210, the system 200, using the server 250, determines whether the density of persons in the area determined at step 1205 is greater than or equal to a predetermined threshold value (e.g., a crowding threshold). For example, the system 200 may determine whether a number of person in the area exceeds a predetermined number of persons. If the system 200 determines that the density is greater than or equal to the predetermined threshold value, then flow proceeds to step 1215, and the method for a crowded area is executed as illustrated in FIG. 11, starting at step 1130. On the other hand, if the system 200 determines that the density is not greater than or equal to the predetermined threshold value, then flow proceeds to step 1220.

At step 1220, persons enter the area. At step 1225, the system 200, using the one or more cameras 210, the one or more sensors 220, and the server 250, determines whether additional persons are entering the area. If the system 200 determines that additional persons are entering, then flow returns to step 1220. On the other hand, if the system 200 determines that no additional persons are entering, then flow proceeds to step 1230.

At step 1230, the system 200, using the one or more cameras 210 and the server 250, determines a number of persons in the area. The system 200, using the server 250, also determines a maximum occupancy area and a maximum occupancy region for each person based on the number and sizes of the persons in the area. A person near a wall may have a smaller maximum occupancy region, which may be acceptable since a region near the wall side may not be possible to occupy.

According to an embodiment, the maximum occupancy area for person may be determined by the system 200, using the server 250, as follows, where F is the floor area of the area such as the elevator car, the train car, the room, or the other location and P is the minimum occupancy area of the person:

$$1.\ P_1 + \ldots + P_n = \sum_{k=1}^{n} P_k$$

$$\sum_{k=1}^{n} P_k:$$

Sum of minimum occupancy areas of the persons $$2.\ F - \sum_{k=1}^{n} P_k = \text{Remainder of } F$$

Remainder of $F$/number of the persons=$f$  3.

f: Relocatable floor area per person $P_k + f = P_k f$  4.

$P_k f$: Maximum area allowed to be occupied by a person

Figure 13A:
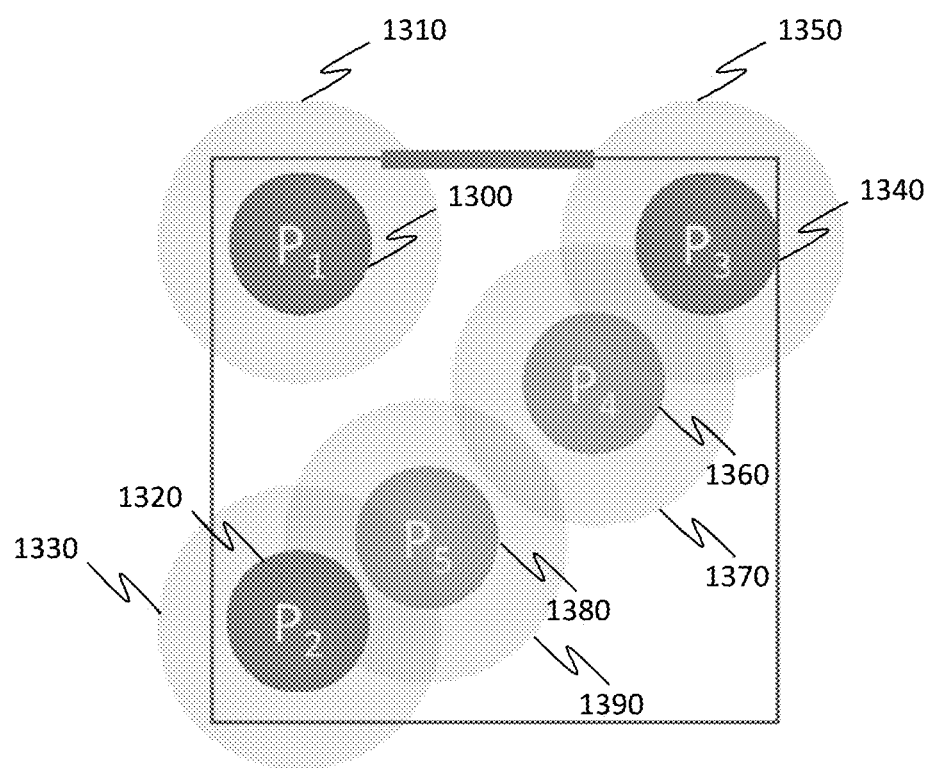
FIGS. 13A, 13B, 13C, and 13D illustrate an example of the system in operation in accordance with aspects of the invention.
Figure 13B:
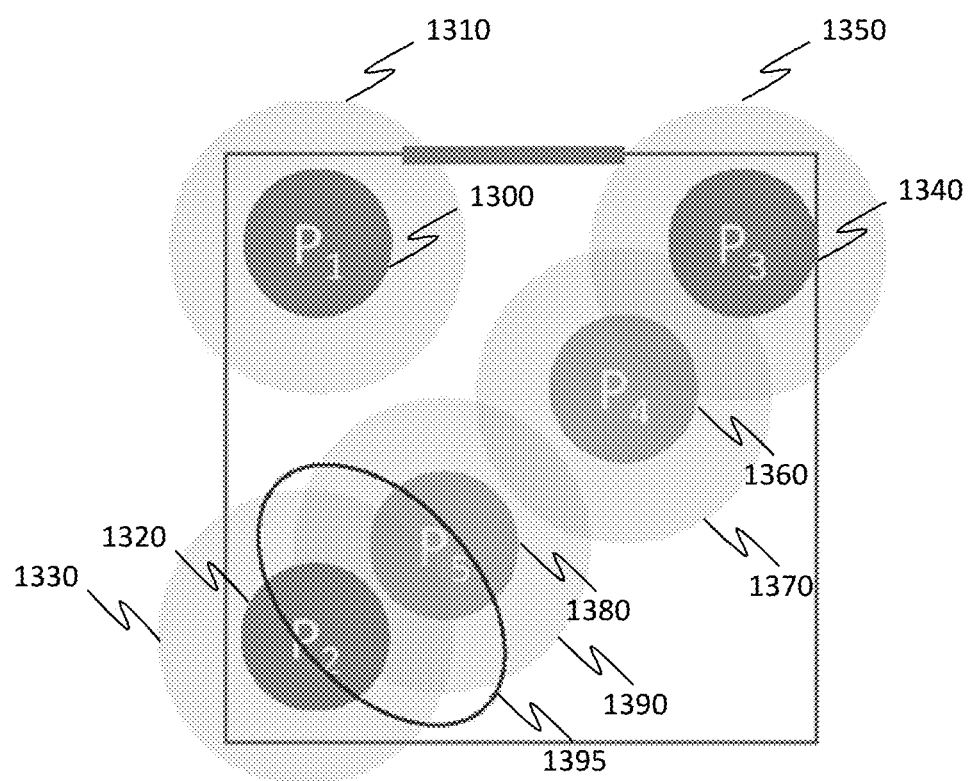
Figure 13C:
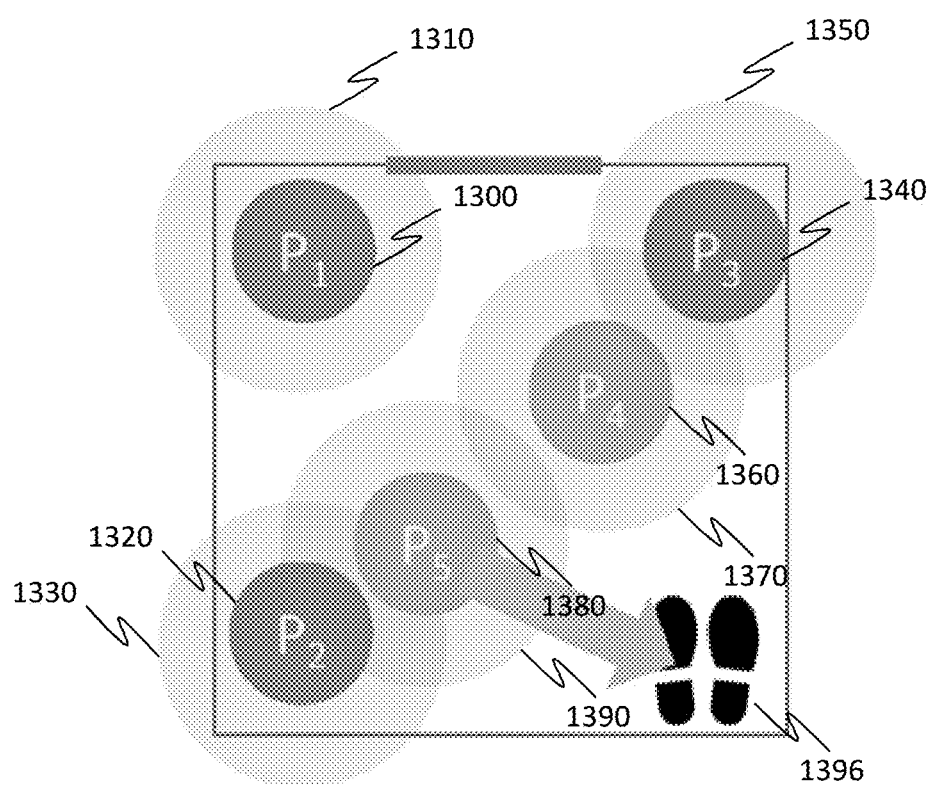
Figure 13D:
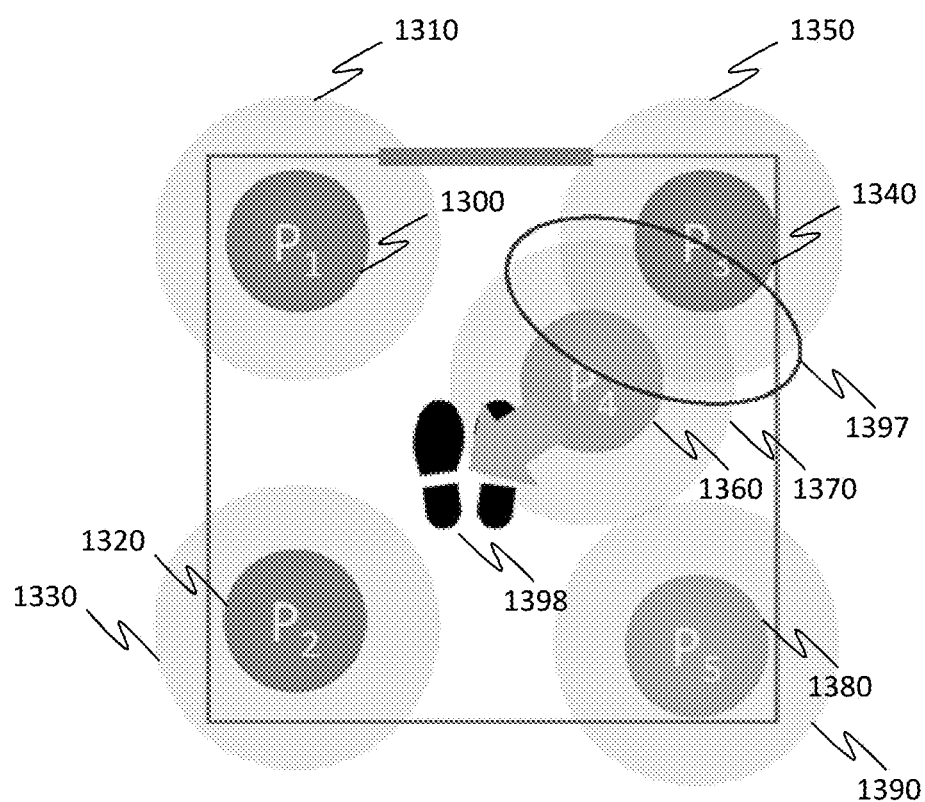

At step 1235, for each pair of persons having overlapping maximum occupancy regions, the system 200, using the server 250, determines whether the overlapping region is greater than or equal to a threshold value, as described below with respect to FIG. 13B. If the system 200 determines that no pair of persons has an overlapping region that is greater than or equal to the threshold value, then flow proceeds to step 1240 and processing ends. On the other hand, if the system 200 determines that one or more pairs of persons have an overlapping region that is greater than or equal to the threshold value, then flow proceeds to step 1245.

At step 1245, the system 200, using the server 250, identifies the pair of persons having the largest overlapping region and determines, using the one or more cameras 210, the location of free space near the pair of persons, as described herein. At step 1250, the system 200, using the server 250, determines a new standing position in the free space for the person from the pair of persons who is closest to the free space determined at step 1245. The new standing position is determined such that an overlapping area of the person with other persons is smallest. The system 200, using the server 250, may then cause the display device 230 to display footprints at a location of the person from the pair of persons who is closest to the free space determined at step 1245. The system 200, using the server 250, may then cause the display device 230 to display footprints at the new standing position in the free space for the person closest to the free space from the pair of persons determined at step 1245. The footprints may be displayed moving between the location of the determined person adjacent to the free space and the new standing position for the determined person. Flow then returns to step 1235.

According to an alternative embodiment, prior to persons entering the area in step 1220, the system 200, using the server 250, may determine the maximum occupancy area for each person, including the persons about to enter, and determine a maximum occupancy region for each person corresponding to the maximum occupancy area. The system 200, using the server 250, may then cause the display device 230 to display footprints to lead one or more persons already in the area to new standing positions. The system 200, using the server 250, may then cause the display device 230 to display footprints to lead one or more waiting persons to standing positions in the area.

According to another embodiment, when a door of an area such as an elevator car, train car, room, or other location is opened, the system 200, using the server 250, may cause the display device 230 to present footprints to a person near the door to lead that person to a new standing position that does not obstruct another person who is exiting the area. According to yet another embodiment, when the floor of an area such as an elevator car, train car, room, or other location is obstructed or otherwise not visible due to, for example, crowds or baggage, the system 200, using the server 250, may cause the display device 230 to present footprints on a display on the ceiling or a wall of the area.

Example 1

According to Example 1, at step 1230 as described above, for each person in an elevator car, the system 200 determines a maximum area allowed to be occupied by each person based on a number of persons in the elevator car as well as the size of each person in the elevator car and then determines a maximum occupancy region for each person corresponding to the maximum area. In this example, the maximum occupancy region is determined to have a circular shape and the same area for every person. The maximum occupancy area may be determined as follows.

F: floor area=4 m²
P: Minimum occupancy area of a person=0.2 m²
Radius $r_p$=0.25 m; $P=\pi r^2=3.14 \times (0.25)^2=0.196 \approx 0.2$ m²

$$1.\ P_1 + \ldots + P_5 = \sum_{k=1}^{5} P_k = 1.0\ m^2$$

$$4.0\ m^2 - 1.0\ m^2 = 3.0\ m^2 \qquad 2.$$

$$3.0\ m^2/5 = 0.6\ m^2: \text{Relocatable floor area per person} \qquad 3.$$

$$0.2\ m^2 + 0.6\ m^2 = 0.8\ m^2 = Pf: \qquad 4.$$

Pf: The maximum area allowed to be occupied by a person
$0.8\ m^2 = \pi r_{pf}^2$
$r_{pf}^2 = 0.8/3.14 = 0.254 = (\sqrt{0.254})^2$
$r_{pf} = \sqrt{0.254} = 0.504 \approx 0.5$
Pf=a circle with a radius of about 0.5 m Example 2

FIGS. 13A, 13B, 13C, and 13D illustrate an example of the system 200 in operation in accordance with aspects of the invention. According to Example 2, in steps 1235, 1245, and 1250 as described above, the following processing may be performed by the system 200. For each of the persons 1300, 1320, 1340, 1360, and 1380, the system 200, using the server 250, determines the maximum occupancy regions 1310, 1330, 1350, 1370, and 1390, assuming the position of each person to be the center of each maximum occupancy region.

The system 200, using the server 250, identifies a pair of persons 1320 and 1380 having maximum occupancy regions 1330 and 1390 with an overlapping region 1395 (illustrated in FIG. 13B) having an area greater than a threshold value and also having the greatest overlapping region among all of the pairs of persons. The threshold value may vary depending on the number of the persons in the elevator car. When pairs having an equal overlapping area are present, any of the pairs may be selected.

The system 200, using the server 250, then determines a free space using the one or more cameras 210 and causes the display device 230 to present footprints 1396 (illustrated in FIG. 13C) so as to lead the person 1380 of the pair who is closest to the free space to move to the free space.

The system 200 may repeat the above steps and, using the server 250, determine a pair of persons 1340 and 1360 having maximum occupancy regions 1350 and 1370 with an overlapping region 1397, determine a free space, and cause the display device 230 to present footprints 1397 (illustrated in FIG. 13D) so as to lead the person 1360 of the pair who is closest to the free space to move to the free space.

In embodiments, a service provider could offer to perform the processes described herein. In this case, the service provider can create, maintain, deploy, support, etc., the computer infrastructure that performs the process steps of the invention for one or more customers. These customers may be, for example, any business that uses cloud computing technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer program product comprising a computer readable storage medium having program instructions embodied therewith, the program instructions executable by a computing device to cause the computing device to:

determine free spaces in a location using at least one camera; and display an image, in the location, to indicate a select free space of the free spaces in the location for at least one of a plurality of people in a waiting area, the image directing the at least one of the plurality of people from the waiting area to move to the select free space in the location.

2. The computer program product according to claim 1, wherein the program instructions further cause the computing device to:

determine a size of each of the plurality of people in the waiting area; and determine the select free space in the location for the at least one of the plurality of people in the waiting area based on the determined size of each of the persons in the waiting area.

3. The computer program product according to claim 1, wherein the program instructions further cause the computing device to:

determine a new position for a person already in the location that is farther from an entrance to the location than a current position of the person already in the location; and display a suggested new position image to indicate the determined new position in the location for the person already in the location.

4. The computer program product according to claim 3, wherein the program instructions further cause the computing device to determine the select free space in the location based on a newly created free space that was previously occupied by the person already in the location.

5. The computer program product according to claim 1, wherein the program instructions further cause the computing device to determine the select free space in the location automatically in response to an opening of a door to the location.

6. The computer program product according to claim 1, wherein the program instructions further cause the computing device to determine the select free space in the location automatically in response to determining that persons have finished exiting the location.

7. The computer program product according to claim 1, wherein the image is a footprint.

8. The computer program product according to claim 7, wherein the footprint is displayed moving between a current position of the at least one of the plurality of people waiting to enter the location and the select free space.

9. A system comprising: a hardware processor, a computer readable memory, and a computer readable storage medium associated with a computing device; program instructions to determine free spaces in a location using at least one camera; and program instructions to display an image in the location to indicate a select free space of the free spaces for at least one of a plurality of people in the location, the image directing the at least one of the plurality of people to move from a current position in the location to a new position in the location, wherein the program instructions are stored on the computer readable storage medium for execution by the hardware processor via the computer readable memory.

10. The system according to claim 9, further comprising program instructions to determine a density of people in the location using the at least one camera.

11. The system according to claim 10, further comprising program instructions to, in response to determining that the density is less than a predetermined threshold value, determine, as the new position, a position that is farther from a second person in the location.

12. The system according to claim 10, further comprising program instructions to, in response to determining that the density is greater than or equal to a predetermined threshold value, determine, as the new position, a position that is farther from an entrance to the location.

13. The system according to claim 9, further comprising a display device installed on or under a floor of the location, wherein the image is displayed by the display device.

14. The system according to claim 13, wherein the display device is a digital projector that projects the image onto a transmissive projection screen located between the digital projector and the floor.

15. The system according to claim 14, wherein a protective surface is installed above the projection screen.

16. The system according to claim 13, wherein the display device is positioned such that the image displayed by the display device covers all of the floor of the location.

17. The system according to claim 13, wherein a protective surface is installed above the display device.

18. The system according to claim 13, wherein the protective surface is reinforced glass.

19. The system according to claim 9, further comprising:

program instructions to determine a number of persons who are in a waiting area waiting to enter the location;

program instructions to determine at least one additional free space in the location using the at least one camera;

program instructions to determine an additional select free space in the location for at least one of the plurality of people in the waiting area based on the determined at least one additional free space in the location; and program instructions to display an additional image, in the location, to indicate the determined additional select free space in the location for at least one other of the plurality of people in the waiting area, the additional image directing the at least one other of the plurality of people from the waiting area to move to the determined additional select free space in the location.

20. The system according to claim 9, wherein:

the at least one camera includes a first camera in the location and a second camera in the waiting area, and the second camera is used to determine the number of persons who are in the waiting area.

\* \* \* \* \*